United States Patent
Smith

(10) Patent No.: US 7,332,707 B2
(45) Date of Patent: Feb. 19, 2008

(54) AISLE WIDTH SENSOR FOR MOBILE STORAGE SYSTEMS

(75) Inventor: Jak L. Smith, Parkersburg, WV (US)

(73) Assignee: Kardex Systems Inc., Marietta, OH (US)

( * ) Notice: Subject to any disclaimer, the term of this patent is extended or adjusted under 35 U.S.C. 154(b) by 243 days.

(21) Appl. No.: 11/140,321

(22) Filed: May 27, 2005

(65) Prior Publication Data
US 2006/0290243 A1    Dec. 28, 2006

(51) Int. Cl.
G01D 5/34 (2006.01)
A47B 77/00 (2006.01)
G01B 11/26 (2006.01)

(52) U.S. Cl. .................... 250/231.1; 312/201; 356/140

(58) Field of Classification Search ................ 312/201, 312/111, 199, 325; 73/854; 356/140; 33/366.23, 33/366.24; 324/207.24, 207.25; 250/231.1–231.13
See application file for complete search history.

(56) References Cited

U.S. PATENT DOCUMENTS 5,443,312 A * 8/1995 Schluter ................. 312/334.27
5,495,677 A * 3/1996 Tachikake et al. ............ 33/784
6,766,583 B2 * 7/2004 Economaki ................... 33/534

* cited by examiner

*Primary Examiner*—Georgia Epps
*Assistant Examiner*—Brian J Livedalen
(74) *Attorney, Agent, or Firm*—Day Pitney LLP

(57) ABSTRACT

The disclosure relates to aisle width sensor for a mobile storage system for determining the width between adjacent movable storage units, particularly when creating an aisle therebetween. The sensor includes a first bracket which is slidable with respect to a second bracket. The first and second brackets are attached to respective first and second arms of a scissor arm arrangement between the adjacent storage units. The sensor provides an output, particularly an analog output, which is proportional to the distance between the adjacent storage units and therefore simple to calculate and process for the central controller of the mobile storage system.

5 Claims, 3 Drawing Sheets

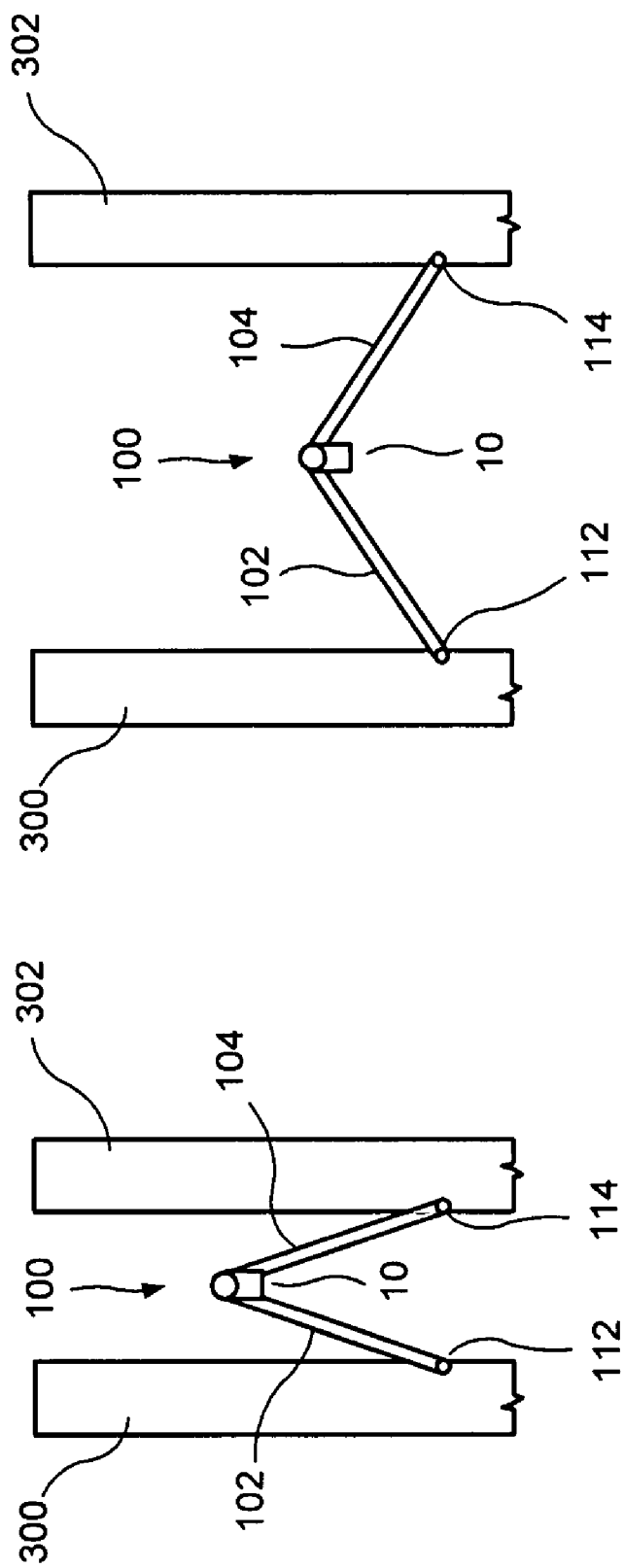

AISLE WIDTH SENSOR FOR MOBILE STORAGE SYSTEMS

BACKGROUND OF THE INVENTION

1. Field of the Invention

The present invention relates to a sensor which senses the width of an aisle created in a mobile storage system when movable storage units are moved to open or close the aisles. The sensor provides a signal to the storage system controller to allow it to determine when to accelerate, decelerate, start and stop moving storage units when creating aisles for user access.

2. Description of the Prior Art

Mobile storage systems are well known in the prior art. These systems include a plurality of storage units, typically bookcases, wherein the end storage units are stationary and the intermediate units are mounted on rails and include an electric motor or other prime mover to propel the storage units along the rails. Typically, the storage units are arranged so that there is sufficient room for a single access aisle within the storage system and the mobile storage units are moved in order to select between which of the storage units the single access aisle is formed.

This general configuration is disclosed in U.S. Pat. No. 5,359,191 to Griesemer et al. entitled "Cross-Aisle Photo-Detector for Mobile Storage System Having a Light Detector Mounted to the Movable Storage Unit".

It has been recognized in the prior art, such as in the above Griesemer et al. reference, that these mobile storage units can be very heavy, particular when full of books or other inventory, and that safety systems are required to prevent the closure of an access aisle between two storage units.

In order to control these units, limit switches have been used, such as disclosed in U.S. Pat. Nos. 5,005,923 and 5,044,703, both entitled "Limit Switch Apparatus Assembly for Mobile Storage Units" and issued to Dahnert. However, these references disclose apparatus which works only when an aisle is closing and cannot be used to decelerate or stop an opening aisle.

Similar deficiencies are encountered in the use physical limits switches on the lower carriage of a storage unit or on the overhead scissor arms and in the use of optical distance sensors. Moreover, optical distance sensors have minimum and maximum sensing limitation that must be accommodated when implementing the sensor. These sensors further typically have a non-linear response which must be compensated for in the controller and are subject to external influences such as ambient lighting and target variations. These sensors are also not suitable for sensing the limits of an opening aisle and do not provide hard-wired "end-of-travel" limits.

U.S. Pat. No. 5,670,778 entitled "Presence Detector for Mobile Storage Systems" issued on Sep. 23, 1997 to Smith (the inventor of the present application) discloses a safety system using an array of infrared light sources to detect the presence of a person or object within the aisle created by separated storage units.

Further improvements are sought wherein an electronic processor can monitor the distance between all storage units within the mobile storage system. Moreover, the use of a sensor with a linear output (that is, a signal directly proportional to the distance between adjacent storage units) is desired in order to simplify the required signal processing.

OBJECTS AND SUMMARY OF THE INVENTION

It is therefore an object of the present invention to provide an apparatus and method for monitoring the distance between successive storage units within a mobile storage system.

It is therefore a further object of the present invention to provide an apparatus and method for accomplishing the above objects within a very simple framework, particularly that the signal related to the distance between the successive storage units is linear, or directly proportional to such distance.

These and other objects are attained by providing an aisle width sensor which senses the width of an aisle created in a mobile storage system when movable storage units are moved to open or close the aisles. More specifically, the aisle width sensor is mounted near the pivot point of scissor arm assembly, such as is commonly used to carry power and control signals between movable storage units, that is suspended in the aisle between two movable storage units. The sensor assembly includes two brackets that are fastened together but can slide in slots thereby allowing the brackets to move toward each other or away from each other. A linear sensor is mounted on one of the brackets while the other bracket is connected to the sensor actuator arm. As a result, when the sensor brackets are pulled apart or pushed together, the sensor actuator arm is moved from one end to the other. The sensor movement results in an analog signal. The linear sensor is typically mounted on a printed circuit board that provides a mounting method and wiring connections, and further allows a cable to be connected to a simple connector. Additionally, limit switches may be optionally included to provide electrical end-of-travel limits when used in multiple aisle applications.

As a result, the sensor measures the difference between two existing scissor arms that are connected to each side of the movable storage units to provide an accurate measurement of the aisle width. Measuring the distance between the arms, rather than the angle or position of one of the arms) eliminates the position sensing variations caused by changes in loading and other physical variations. This is especially important when the aisle is nearly closed and the angular position of the arms can vary greatly.

As the sensor operates over the full range of an aisle width, this sensor may be used to limit the size of opening aisles and therefore allows a system to control multiple open aisles. Multiple open aisle systems have additional aisle space allocated that is intended to allow more than one aisle to be opened at a time. The width of any single aisle to be opened must therefore be sensed to create standard aisle widths and limited, preferably with hard-wired end-of-travel switches, to prevent overextending the scissor arms and causing damage to the system. Additionally, other limits can be provided easily and various gaps between ranges can be used for fire related ventilation, sprinkler access, space for filing of protruding items, etc. Virtually all aisle widths can be set by programming references that are compared with the signal from the variable aisle width sensor.

The sensor produces an analog signal that is linear and directly proportional to the width of an aisle thereby providing an unlimited number of aisle width limit sensing positions. The linear analog output signal allows all limit positions to be electrically determined and therefore can be easily adjusted or programmed rather than mechanically or physically adjusted. Because of the linear response, slow-down limits can be automatically predetermined by calculating a fixed reference offset from any programmable limit position. The deceleration limit typically activates prior to the final limit to slow down the movement of the storage unit before stopping.

The resulting analog sensing method is a low cost method to provide an unlimited number of limit sensing positions. A three-wire cable is required to sense any number of limit positions. Moreover, the analog sensing element itself is also very low cost. Additionally, the sensor provides a simple method to implement hard-wired "end-of-travel" limit switch functions that are desirable to further limit and prevent overextending of scissor arms when used in a multiple aisle system mode of operation.

The analog sensor element can be optionally replaced with simple limit switches when only simple aisle closing functions are needed and electrical adjustability is not required.

DESCRIPTION OF THE DRAWINGS

Further objects and advantages of the invention will become apparent from the following description and claims, and from the accompanying drawings, wherein:

FIG. 4 is a top plan view of the aisle width sensor of the present invention attached to a partially closed scissor arm assembly between two movable storage units.

FIG. 5 is a top plan view of the aisle width sensor of the present invention attached to an open scissor arm assembly between two movable storage units with a full aisle formed therebetween.

DETAILED DESCRIPTION OF THE PREFERRED EMBODIMENT

Figure 1:
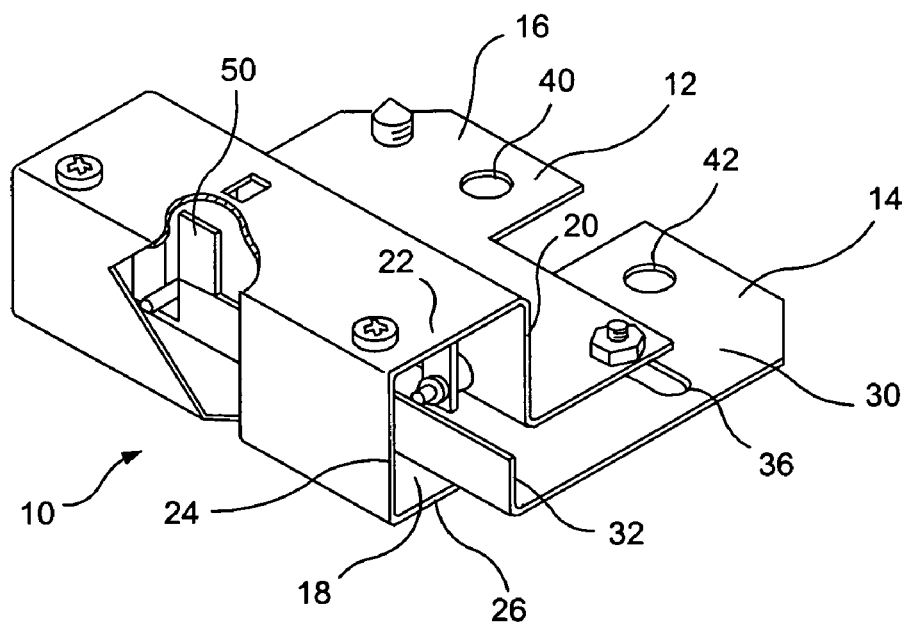
FIG. 1 is a perspective view, partially cut-away, of the aisle width sensor of the present invention.
Figure 2:
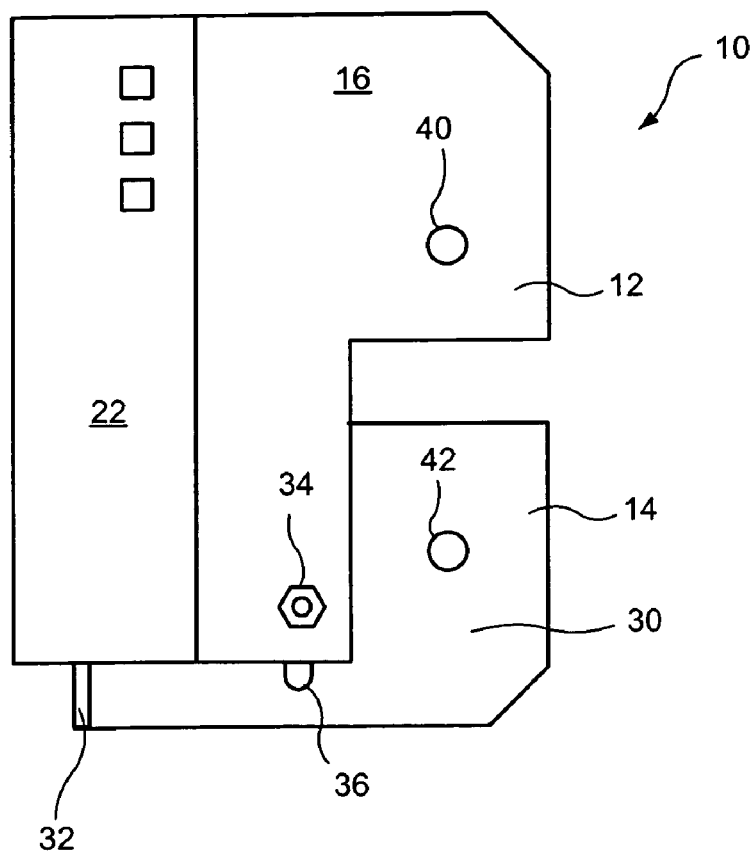
FIG. 2 is a top plan view of the aisle width sensor of the present invention.

Referring now to the drawings in detail wherein like numerals indicate like elements throughout the several views, one sees that FIG. 1 is a perspective view, partially cut-away, of the aisle width sensor 10 of the present invention. Aisle width sensor includes first bracket 12 and second bracket 14. First bracket 12 includes first extending planar portion 16 and further includes housing 18 bounded by walls 20, 22, 24, 26. Second bracket 14 includes second extending planar portion 30 which slidably abuts second extending planar portion 16. Second bracket 14 further includes upturned lip 32 which extends into housing 18 and is slidably mounted therein. Upturned lip 32 includes the sensor actuator arm. First extending planar portion 16 includes aperture 34 through which bolt 35 extends, thereby engaging slot 36 formed in second extending planar portion 16 and bounding the extent that first and second brackets 12, 14 can slide with respect to each other with a single degree of freedom. First extending planar portion 16 further includes first mounting aperture 40 and second extending planar portion 30 further includes second mounting aperture 42 for the mounting of aisle width sensor 10 on the scissor arm assembly 100 shown in FIGS. 3-5.

Printed circuit board 50, which includes the linear sensor, is mounted on the interior of wall 20 (shown in cut-away on FIG. 1). The linear sensor on printed circuit board 50 senses the linear position or displacement of upturned lip 32, including the sensor actuator arm, within housing 18 (proportional to the distance that second bracket 14 is pulled away from first bracket 12) and produces an analog electrical signal which is proportional to this linear position or displacement. Printed circuit board 50 may further include end-of-travel limit switches which are activated when second bracket 14 has been pulled away from or pushed toward first bracket 12 by the maximum allowable distance.

Figure 3:
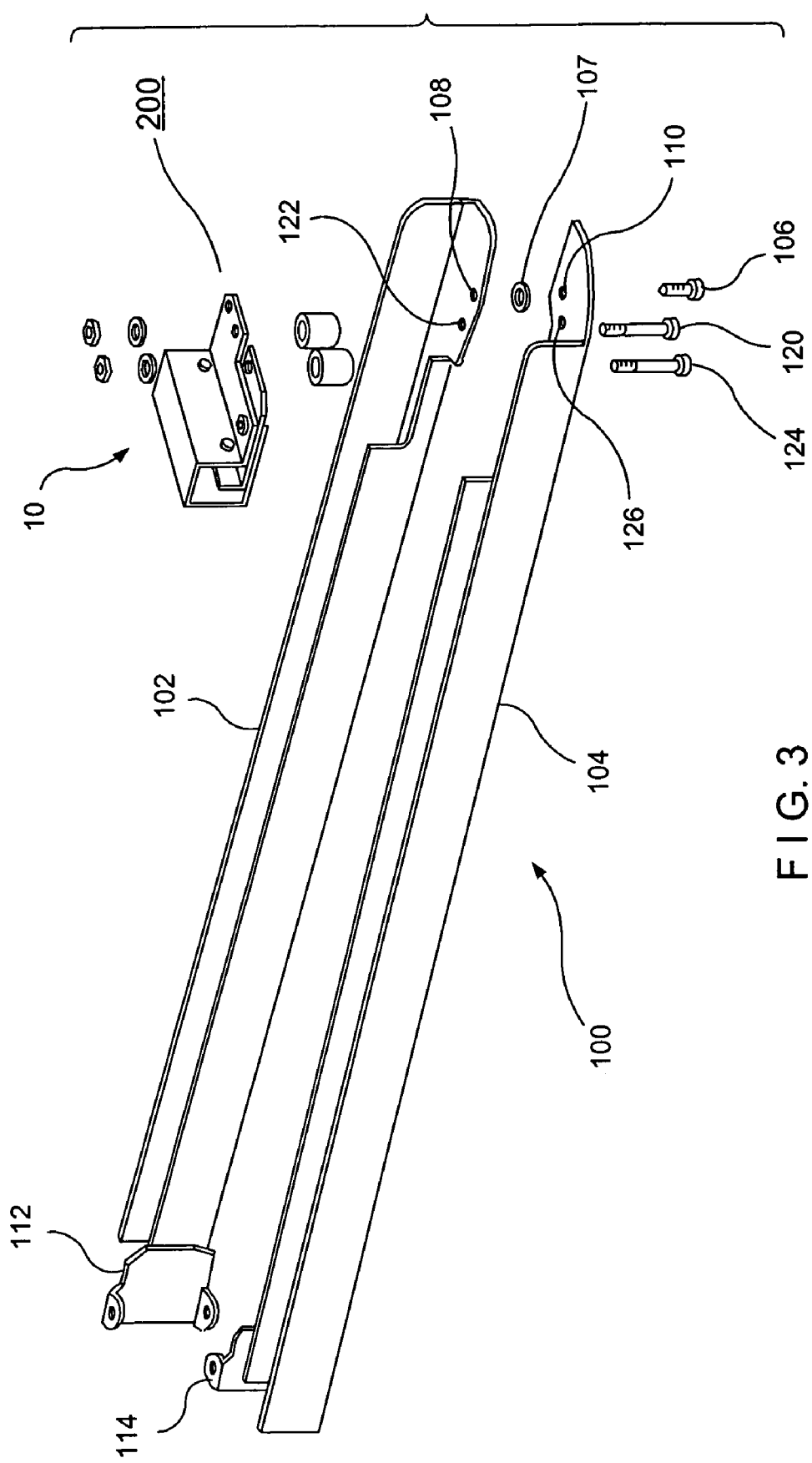
FIG. 3 is an exploded perspective view of the aisle width sensor of the present invention, attached to a scissor arm assembly.

As shown in FIGS. 3-5, scissor arm assembly 100 includes first scissor arm 102 pivotably attached to second scissor arm 104 by bolt 106 (typically including washer 107) through first and second scissor arm pivot apertures 108, 110. The free ends 112, 114 of first and second scissor arms 102, 104 are attached to adjacent mobile storage units 300, 302, respectively (mobile storage unit systems typically have several mobile storage units and, at the end of the storage system, one of said mobile storage units may be replaced by a wall or a stationary storage unit). First bracket 12 is mounted on first scissor arm 102 via bolt 120 through first mounting aperture 40 and first scissor arm mounting aperture 122 immediately inwardly adjacent from first scissor arm pivot aperture 108. Likewise, second bracket 14 is mounted on second scissor arm 104 via bolt 124 through second mounting aperture 42 and second scissor arm mounting aperture 126 immediately inwardly adjacent from second scissor arm pivot aperture 110.

The resulting analog signal from printed circuit board 50 is sent to a storage system controller 200 (see FIG. 3) which uses the information from one or more aisle width sensors 10 to determine the position of the various movable storage units 300, 302 (see FIGS. 4 and 5) and further to determine the desired or acceptable movements of the various movable storage units 300, 302. By reason of "similar triangles", it may be shown that the relative displacement of first and second brackets 12, 14 with respect to each other is proportional to the relative displacement of mobile storage units 300, 302 with respect to each other, thereby resulting in substantially linear output.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A mobile storage system, comprising:
   at least one movable storage unit;
   an opposing object selected from the group consisting of a wall, a second mobile storage unit, and a stationary storage unit;
   an electronic control system determining the location of said at least one movable storage unit and generating signals to move said at least one movable storage unit;
   sensor assemblies between successive movable storage units or opposing objects, comprising:
   a first arm with a first end and a second end;
   a second arm with a first end and a second end, wherein said first end of said first arm is pivotably arranged with respect to said first end of said second arm, said second end of said first arm being arranged to attach to the first movable storage unit and said second end of said second arm being arranged to attach to the second movable storage unit;
   a first bracket secured to said first arm;
   a second bracket secured to said second arm and slidably engaged with said first bracket;

a sensor within said first bracket sensing relative movement of said second bracket and generating a signal in response thereto and communicating the signal to said electronic control system.

2. The mobile storage system of claim 1 wherein said second bracket includes a slot and said first bracket includes an aperture, and further including a fastener passing through said slot and said aperture.

3. The mobile storage system of claim 2 wherein said first bracket includes a housing for said sensor, said housing being bounded by a plurality of walls.

4. The mobile storage system of claim 3 wherein said first bracket includes a first planar portion and said second bracket includes a second planar portion, wherein said first and second planar portions slide against each other.

5. The mobile storage system of claim 4 wherein said second planar portion is engaged between said first planar portion and one of said plurality of walls of said housing.

* * * * *